US006947450B2

(12) United States Patent
Mangin

(10) Patent No.: US 6,947,450 B2
(45) Date of Patent: Sep. 20, 2005

(54) METHOD AND A DEVICE FOR DETERMINING PACKET TRANSMISSION PRIORITY BETWEEN A PLURALITY OF DATA STREAMS

(75) Inventor: Christophe Mangin, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 832 days.

(21) Appl. No.: 09/749,806

(22) Filed: Dec. 28, 2000

(65) Prior Publication Data

US 2001/0007570 A1 Jul. 12, 2001

(30) Foreign Application Priority Data

Jan. 5, 2000 (EP) ............................................ 00400018

(51) Int. Cl.[7] ................................................ H04J 3/02
(52) U.S. Cl. ...................................... 370/537; 370/474
(58) Field of Search ............................. 370/230, 230.1, 370/231, 235, 235.1, 412, 413, 414, 415, 416, 417, 418, 474, 537, 538, 539, 540, 541; 710/52, 56

(56) References Cited

U.S. PATENT DOCUMENTS

| | | | | |
|---|---|---|---|---|
| 5,864,540 A | * | 1/1999 | Bonomi et al. | 370/235 |
| 6,011,775 A | * | 1/2000 | Bonomi et al. | 370/230 |
| 6,396,834 B1 | * | 5/2002 | Bonomi et al. | 370/394 |
| 6,408,006 B1 | * | 6/2002 | Wolff | 370/412 |
| 6,477,144 B1 | * | 11/2002 | Morris et al. | 370/230.1 |
| 6,570,883 B1 | * | 5/2003 | Wong | 370/412 |
| 6,724,766 B2 | * | 4/2004 | Michiel | 370/412 |

FOREIGN PATENT DOCUMENTS

| | | |
|---|---|---|
| EP | 0 905 994 | 3/1999 |
| EP | 0 952 753 | 10/1999 |

OTHER PUBLICATIONS

J. W. Roberts, International Journal of Communication Systems, vol. 7, No. 4, pp. 307–318, XP 000672879, "Virtual Spacing for Flexible Traffic Control", Oct. 1, 1994.

* cited by examiner

*Primary Examiner*—Bob A. Phunkulh
(74) *Attorney, Agent, or Firm*—Oblon, Spivak, McClelland, Maier & Neustadt, P.C.

(57) ABSTRACT

A method of multiplexing in a multiplexer a plurality of data streams to a single channel each of the data streams containing a plurality of fixed length data packets being serially transmitted from a source to a destination by way of the data stream and the channel. The method includes for each data stream, receiving a data packet at an input of a data stream; segmenting the data packet into segments; and assigning a time label to the data packet. The time label is transmitted to the multiplexer at a first signal from the multiplexer, the segments having the data packet are transmitted to the channel at a second signal from the multiplexer; and the time label is stored as a previously transmitted stream time label.

12 Claims, 5 Drawing Sheets

METHOD AND A DEVICE FOR DETERMINING PACKET TRANSMISSION PRIORITY BETWEEN A PLURALITY OF DATA STREAMS

The present invention relates to network data transmission arbitration methods and devices. Specifically the present invention relates to a method and a device for determining packet transmission priority between a plurality of data streams.

The growth and explosion of Internet applications for which the Internet was not designed require the development of new protocols and methods which will give these new applications the level and quality of service they require.

The quality of service is notably expressed in terms of transfer time for packets used by the applications, Obviously, applications with heavy time constraints, such as Internet telephony and speech based Internet applications require bounded packet transfer times and, hence, a high quality of service. For other applications, transfer time is not as important as the integrity of the data during transfer. For these applications, such as data transfer applications, a high quality of service means minimal if not non-existent data loss or corruption.

However, quality of service is not the only criteria by which the new protocols and methods are to be judged. The Internet must also be able to transfer ever increasing volumes of data at higher and higher transmission speeds.

Currently, a number of solutions to the above problems are being explored. One of these is the so-called label switching method (or MPLS Multi Protocol Label Switching) which consists of adding a small sized label to each packet as the packet enters a network. This label is then used at the core of the network to forward the packet instead of the layer 3 header (corresponding to the layer 3 or network layer of the OSI Reference Model) normally used for packet processing.

The addition of a label to a packet can be done based on different criteria. The addition can be done based on topological criteria such as one label for all packets with a similar destination. The addition can also be done based on service criteria, such as associating one label for packets carrying speech data and another label for packets carrying data for a mass data transfer. The addition of labels can also be done based on a combination of not only any of the above criteria but of others as well. The above essentially classifies data into specific streams—with streams being seen as a grouping of data packets with a specific characteristic. The simplicity of the label concept allows the isolation of services and the use of mechanisms for relaying high speed packets.

The simplicity and flexibility of MPLS opens up a gamut of possibilities for those implementing the label concept. The added label can constitute an additional field in the IP (Internet Protocol) packets or the IP packets can be encapsulated in a layer 2 (data link layer as dictated by the OSI preference Model and can use any of the well known protocols such as Asynchronous Transfer Mode ATM or Frame Relay) whose Protocol Data Unit (PDU) header constitutes the label. If implementing the MPLS method on an ATM system, the label is the header of each cell transporting the packet segments resulting in multiplexing layer 3 packets onto layer 2 virtual channels. Particularly in such an implementation, a method and a device are required for multiplexing packets on a virtual circuit.

There have been some attempts at resolving the MPLS problem. Notably, there exists a method for selecting the packets to be sent according to the theoretical arrival times of the packets, the arrival times being calculated on the basis of a guaranteed minimum transmission speed. This method belongs to the so-called SCVSA (Self Clocked Virtual Scheduling Algorithm) family.

However, the use of these techniques remains complicated and does not take advantage of possible interworking with the target layer 2, here the ATM, in particular, the principles of multiplexing according to transmission speeds at octet level and the use of complex operations (multiplication, division etc.) to obtain the theoretical sending or receiving times of the packets according to their (variable) length.

The present invention overcomes the above shortcomings and takes advantage of the peculiarities of the ATM system. In the ATM case, since the cells are of fixed size, the specification alone of an intercell period is sufficient to define a transmission speed and to control it. It is therefore possible to take advantage of this characteristic to define the transmission speed of, a stream of packets segmented by an ATM adaptation layer by specifying an inter-segment period. The calculation of a theoretical sending or receiving time can then be performed by means of a simple addition/accumulation of the inter-segment period at the time of the processing of each segment of a packet by the adaptation layer. Since the inter-segment period and inter-cell period are strictly equivalent, the transmission speed of an ATM connection supporting an aggregate of streams is the sum of the transmission speeds at the AAL (ATM Adaptation Layer) level of each stream.

Different data streams are multiplexed on to a single virtual channel (VC) by segmenting and then queuing the data packets in each data stream and assigning a specific time label to each data packet. Each data stream therefore has a queue of data packets with the packet at the head or front of the queue being assigned a specific time label. The time label indicates a theoretical arrival time for the packet and is calculated by taking advantage of the uniformity of guaranteed minimum transmission speeds. For every segment generated from a packet, a transmission inter-segment time is added to the theoretical arrival time initially having a value dependent on the previous theoretical arrival time. Once the final segment has been generated, the obtained theoretical arrival time is the theoretical arrival time for the whole packet.

Once each data stream with data packets has had time labels assigned to their head of queue data packets, sorting determines which data packet has the earliest arrival time. When this data packet has been determined, it is the packet transmitted on the initial channel.

In one embodiment, the present invention accomplishes the above by providing a method of multiplexing in a segmentation and multiplexing device a plurality of data streams to a single channel serially, each of said data streams containing a plurality of data packets being transmitted from a source to a destination by way of the data stream and the channel, the method comprising:

a) receiving a data packet at an input of a data stream;
b) segmenting the data packet into segments;
c) assigning a time label to the data packet, the time label containing data indicating a first arrival time for the packet at the segmentation and multiplexing device;
d) transmitting the time label to the multiplexer at a first signal from the multiplexer;
e) transmitting the segments comprising the data packet to the channel at a second signal from the multiplexer; and
f) storing the time label as a previously transmitted stream time label;

for the multiplexer;

aa) signalling a data stream to transmit a time label by sending the first signal;

bb) receiving a received time label from a data stream, the received time label being associated with the data stream transmitting the received time label;

cc) storing the received time label in a group of received time labels the group of time labels containing received time labels from other data streams;

dd) sorting the group of received time labels to determine a transmitting time label with an earliest estimated arrival time of the group;

ee) sending a second signal to the data stream associated with the transmitting time label to transmit the segments comprising a transmitting data packet to the channel, said transmitting data packet being a data packet assigned with the transmitting time label;

ff) storing the transmitting time label as a previously transmitted channel time label; and gg) removing the transmitting time label from the group after the segments comprising the transmitting data packet have been transmitted.

In another embodiment, the present invention provides a device for multiplexing a plurality of data streams onto a single channel, each of said data streams containing a plurality of data packets being transmitted to a destination, the device including:

receiving means for receiving the data packets from the plurality of data streams;

buffering memory means for each data stream for serially buffering received data packets;

processor means for:

a) measuring:

a size of the segments; and a size of the packets;

b) calculating and assigning a time label to each data packet, said time label containing data indicating an estimated arrival time for each packet at the multiplexing device;

c) comparing time labels of data packets to determine a transmitting time label having an earliest estimated arrival tire of the data packets;

d) segmenting each received data packet into segments:

transmission means for transmitting to the single channel the segments comprising the data packet assigned the transmitting time label having the earliest estimated arrival time;

gating means for controlling the transmission of data packets from the buffering memory means to the processing means;

time label buffer memory means for storing time labels assigned to the data packets; and segment buffer memory means for temporarily storing the segments;

wherein the processor means is coupled to:

the segment buffer memory means;

the transmission means;

the gating means; and the time label buffer memory means;

the buffering memory means is coupled between the receive means and the gating means.

In a further embodiment, the invention provides a method of determining transmission priority for data packets between data streams, each data stream having a plurality of data packets for transmission to a destination, the method comprising:

a) for each data stream:

aa) serially arranging the data packets into a stream queue having a front;

ab) assigning a time label to a data packet at the front of the stream queue, said time label containing data indicating an estimated arrival time for said data packet at a segmentation and multiplexing device;

ac) associating the time label with the data stream which contains the data packet assigned to the said time label;

b) determining which time label from the time labels assigned has an earliest estimated arrival time;

c) giving transmission priority to the data stream associated with the time label having the earliest estimated arrival time, said transmission priority being for transmitting the data packet assigned to the time label having the earliest estimated arrival time.

In yet another embodiment, the invention provides a device for multiplexing a plurality of data streams onto a single channel, each of said data streams containing a plurality of data packets being transmitted to a destination, the device including:

receiving means for:

a) receiving and segmenting the data packets into segments, said data packets being received from the plurality of data streams;

b) measuring:

a size of the segments; and a size of the packets;

c) calculating and assigning a time label to each data packet, said time label containing data indicating an estimated arrival time for each packet at a destination;

segment buffer memory means for temporarily storing the segments;

processor means for comparing time labels of data packets to determine a transmitting time label having an earliest estimated arrival time of the data packets;

transmission means for transmitting to the single channel the segments comprising the data packet assigned the transmitting time label having the earliest estimated arrival time;

gating means for controlling the transmission of data packets from the segment buffer memory means to the processing means;

time label buffer memory means for storing time labels assigned to the data packets; and wherein the processor means is coupled to the transmission means;

the gating means is coupled between the processing means and the segment buffer memory means and the time label buffer memory means; and the receiving means is coupled to the segment buffer memory means and the time label buffer memory means.

A better understanding of the invention will be obtained by reading the description of the invention below, with reference to the following drawings, in which.

Figure 1:
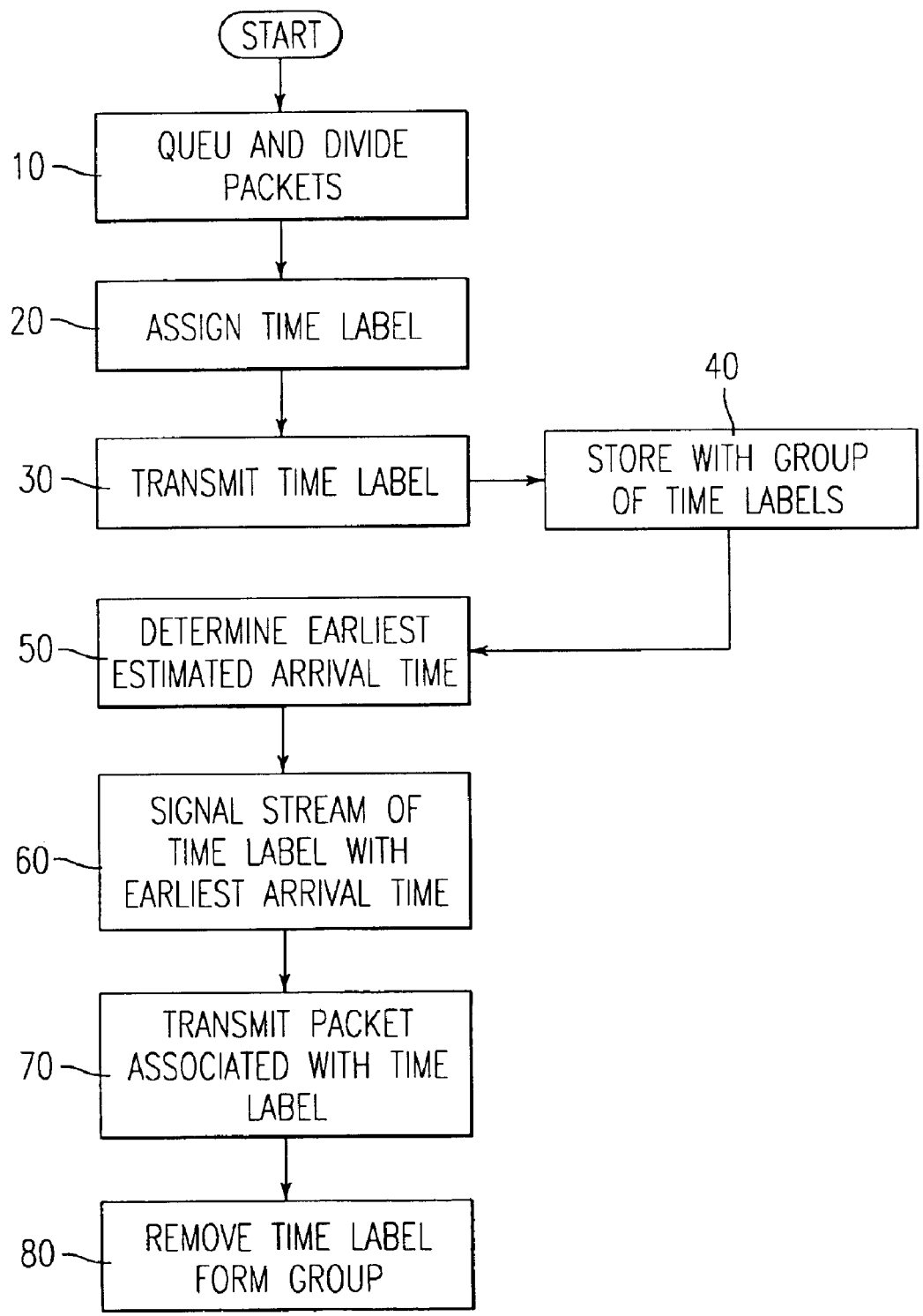
FIG. 1 is a flowchart showing the general steps of the invention.

The operation of the invention can best be illustrated by applying it to IP (Internet Protocol) streams. The ATM Virtual Channel (VC) in which each stream is multiplexed is chosen according to switching information or transported service information originating from the use of signalling protocols such as those defined within the context of the MPLS architecture.

Regarding the streams themselves, the start and end of a stream may be delimited explicitly by procedures specific to the transport protocols used. An example of such a procedure is the opening or closing of a TCP connection. Similarly, the start and end of a stream can also be implicitly delimited, such as by the detection of the start or end of an activity following the expiry of time-outs. Other means, such as using certain signalling protocols to establish the streams, may be used to indicate the start or end of a stream. One example of such a protocol is the so called SIP or Session Initiation Protocol, used by telephony applications on IP streams.

To aid in understanding the following description, it should be noted that the following conditions are assumed for the network on which the invention is to be practiced.

a) The IP packets are formatted using a type 5 AAL (ATM Adaptation Layer). The SAR-PDU's (Segmentation and Reassembly/Protocol Data Units) are called segments. This means that the IP packets, to be used by the invention, must be divided into units called segments. It is these segment units that are used by the invention.

b) The transmission speed of the Virtual Channel (VC) on which the streams will be multiplexed, is constant or constant in negotiated steps. This constant is expressed in $\lambda_{vc}$ cells per second. This results in an inter-cell period (time separating the transmission of two successive cells) of $$T_{vc} = \frac{1}{\lambda_{vc}}$$

c) Each multiplexed stream, denoted by the identification i, has a guaranteed minimum transmission speed $\phi_i$ expressed in segments per second. Each stream has a corresponding inter-segment period (time separating the transmission of two successive cells) of $$T_i = \frac{1}{\phi_i}.$$

This transmission speed $\phi_i$ is assigned upon detection of the start of a steam either arbitrarily or is extracted from a signalling protocol used to signify a start of a stream. This transmission speed should verify $$\sum_i \phi_i \leq \lambda_{vc} \quad [1]$$

meaning that the sum of all the transmission speeds of all the streams is, at most, equal to the transmission speed of the virtual channel (VC).

To avoid confusion, it should be noted that the VC is an ATM VC and, since ATM uses cells as its unit for transporting data, the VC speed is in cells/sec. Thus, the IP packets will have to be divided into segments so that they can be used by the invention.

It should also be noted that Equation 1 can be used as a basis for a preliminary admission control procedure for the streams with $\phi_i$ or can be used as a parameter for renegotiating the value of $\lambda_{vc}$ when accepting a new stream.

To multiplex the streams on to a single virtual channel, separate steps must be executed for the multiplexer and the streams.

FIG. 1 illustrates a flowchart setting out the different sets of steps to be takes for each stream and for the multiplexer. Of the eight general steps, half relate to the multiplexer and half to the streams.

To begin, the packets which make up a stream must first be queued and divided into segments (step 10). A time label is then assigned to each of the segmented packets in the stream queue (step 20). This time label represents that packet's theoretical arrival time at the segmentation and multiplexing device or multiplexer.

The assigned time label of the packet at the head of the stream queue is then transmitted to the multiplexer (step 30) and stored with a group of time labels from other streams, preferably in a priority queue (step 40). This group of time labels is then sorted (step 50) to determine which time label in the group has the earliest estimated arrival time. such a time label represents the data packet which must be given transmission priority on the virtual channel.

After determining the time label with the earliest arrival time, the multiplexer then signals the stream from which the time label with the earliest arrival time originated (step 60). This signal gives that stream priority to transmit the packet associated with that time label (step 70). After the transmission, the multiplexer then removes that time label from the group of other time labels (step 80). The process then repeats itself from step 30 with the multiplexer receiving a new time label from the stream which last transmitted a data packet on the virtual channel.

Figure 2:
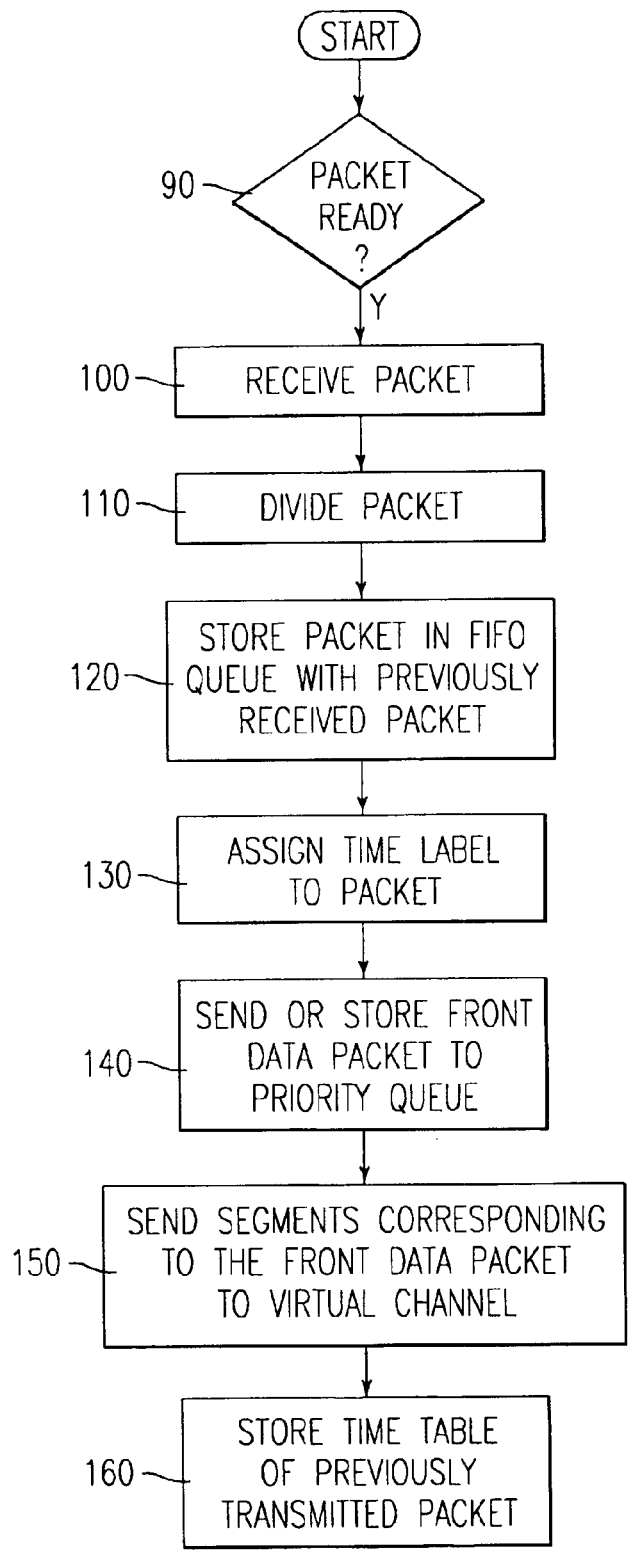
FIG. 2 is a flowchart detailing the steps followed for each stream according to the invention.

To further clarify the steps outlined above, FIG. 2 details the steps taken for each stream. By way of an example, the stream to be examined will be designated as stream A.

First of all, a decision (step 90) must be made as to whether a packet corresponding to stream A is ready to be received. If there is a packet to be received, it is received (step 100) and then divided into segments (step 110). These segments are then stored and referenced through a segment list. The packet received and segmented is stored in a FIFO (first in, first out) queue with other previously received data packets awaiting transmission on the virtual channel (step 120). Each data packet received is assigned a time label, the time label indicating an estimated arrival time for that packet at the multiplexer (step 130).

Since the packets are stored in a FIFO stream queue, with a separate stream queue for each data stream, the packets at the head of the stream queue are those that arrived earliest at their streams. The time labels of these data packets, called front data packet as they are at the front of their respective queues, are sent to or stored in another queue maintained by the multiplexer—the priority queue (step 140).

At this point in the process, the multiplexer gains control. Of course, further packets can continuously be received, segmented, and queued for each data stream, as long as there are resources, such as stream queue slots and spots in the segment list, available for the incoming packets.

Eventually, the multiplexer will signal stream A that stream A's front data packet can be transmitted on the virtual channel. Once this signal from the multiplexer is received, stream A sends the segments corresponding to the front data packet to the virtual channel. (step 150)

After transmitting the segments of the front data packet, stream A stores the time label of the previously transmitted packet, formerly the front data packet, as a previously transmitted stream time label for later possible use. It should be noted that after the front data packet is transmitted, it is superseded by the next data packet in the stream queue.

The assignment of time labels to data packets is critical to the above process and is dependent on the time label of the immediately preceding packet. A running total of the estimated arrival time for each packet is used as each segment from that packet is generated. For clarity, the following variables are defined:

$PAT^{min}$—time label of the packet at the head of the priority queue $$PAT_i^k$$

Packet Arrival Time for the kth packet in stream i assigned as the time label for packet k of stream i)

$$SAT_i^{(k,l)}$$

Segment Arrival Time for the lth segment in the kth packet of stream i. The kth packet is composed of n segments with $n>1 \geq 0$.

Ti—previously defined above as the inter-segment time for stream i.

From the above, the following relationships can be formulated:

$$SAT_i^{j,l} = SAT_i^{(k,l-1)} + T_i w \quad 1 \leq l < n$$

$$SAT_i^{(k,o)} = PAT_i^{k-1}$$

This means that the estimated arrival time for the first segment of packet k is equal to the arrival time of the immediately preceding packet added to the inter-segment time for the data stream. The estimated arrival time of each succeeding segment is equal to the estimated arrival time of the immediately preceding segment added to the inter-segment time for the data stream. Thus, once all the segments comprising a packet have been generated, the final value of $SAT^{k,n}_i$ is the estimated arrival time of the packet. However, this estimated arrival time is not necessarily assigned as the time label of that packet. The assigned time label for packet k of stream i is $$PAT_i^k = \max\{SAT_i^{k,n}, PAT\min\} \quad [2]$$

if the priority queue is not empty.

If the priority queue is empty, the time label for the packet k is determined by $$PAT_i^k = \max\{SAT_i^{k,n}, PAT_{\min}^{-l}\} \quad [3]$$

where $$PAT_{\min}^{-l}$$

is the time label of the last packet sent through the virtual channel.

$$PAT_{\min}^{-l}$$

is stored by the multiplexer after every transmission).

It should be reiterated that the priority queue is the queue of time labels of front data packets from all the streams with available front data packets.

From the above, the assigned time label of a data packet is, if the priority queue is not empty, the later of the estimated arrival time of the data packet and the time label at the head of the priority queue. If the priority queue is empty, the time label assigned is the later of the estimated arrival time and the time label of the last data packet sent on the virtual channel.

Figure 3:
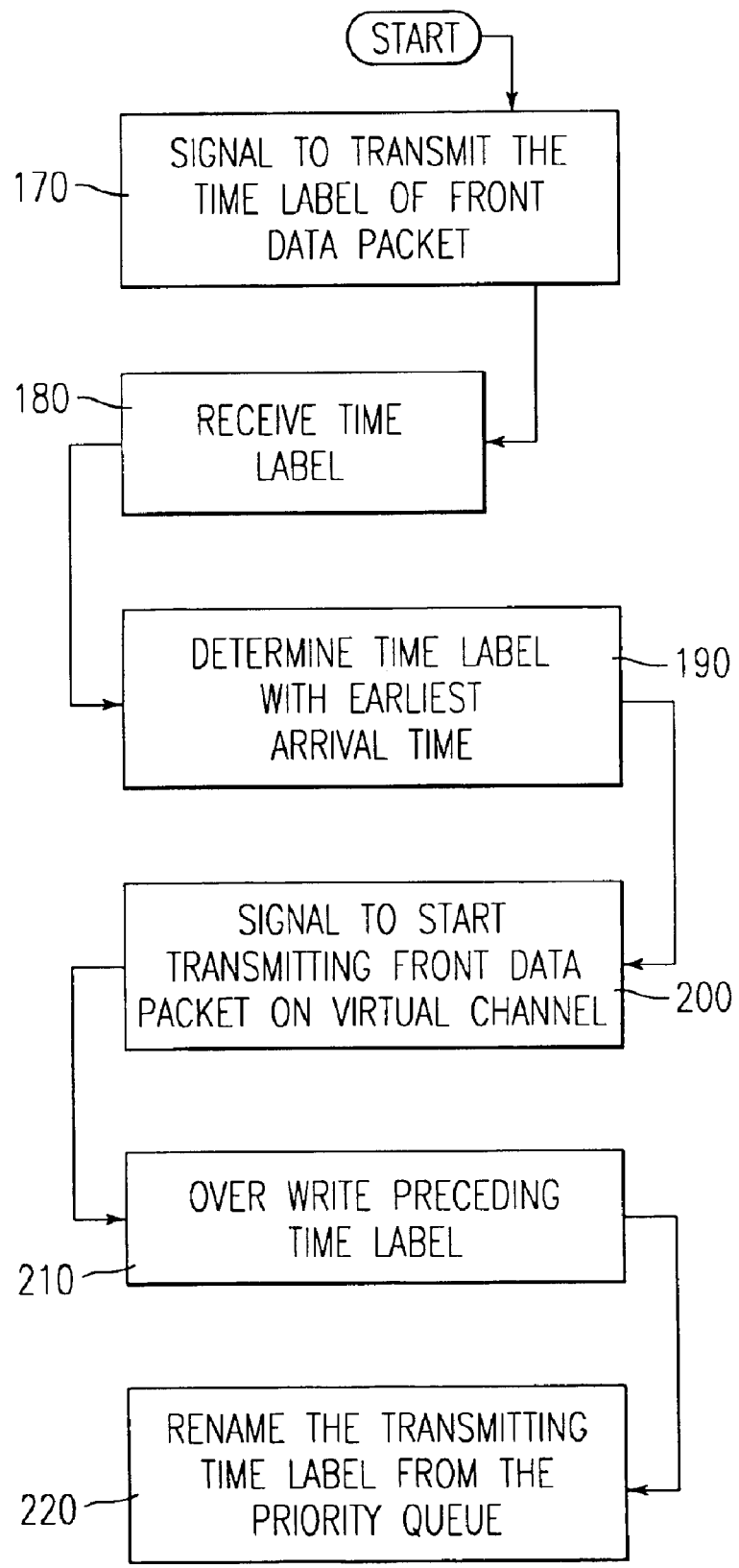
FIG. 3 is a flowchart detailing the steps followed by the multiplexer according to the invention.

Regarding the multiplexer and its role in the process, FIG. 3 enumerates these steps. For clarity, stream A will again be used as an example when needed.

The multiplexer's role in the process begins by sending a signal to stream A to transmit the time label of the front data packet (step 170). It should be noted that this is done only if stream A is not represented in the priority queue maintained by the multiplexer.

The next step (step 180) consists of the multiplexer receiving the time label from stream A. This received time label from stream A is stored in the priority queue. The priority queue, as noted above, contains other received time labels of front data packets from other streams.

The next step in the process is for the multiplexer to sort the priority queue to determine which time label in the priority queue has the earliest arrival time (step 190). This time label with the earliest arrival time; now the transmitting time label, represents the next data packet to be sent on the virtual channel.

Once the priority queue is sorted, with the transmitting time label at the head of the priority queue, the multiplexer signals the data stream associated with the transmitting time label to start transmitting its front data packet on the virtual channel. The data stream signaled will transmit the segments comprising its front data packet on the virtual channel. This corresponds to step 150 in FIG. 2.

After the signaled data stream has transmitted its front data packet, the multiplexer stores the transmitting time label for possible future use. One such use arises when the priority queue is empty and a time label has to be assigned to a data packet in a stream. This aspect of the process has been described above. Once the transmitting time label is stored, it overwrites the immediately preceding transmitting time label. (step 210) Only after this point can the transmitting time label be removed from the priority queue (step 220).

Once the transmitting time label is removed from the priority queue, the process for the multiplexer starts over. Since the data stream which just transmitted its front data packet is no longer represented in the priority queue, this data stream is queried by the multiplexer for the time label of the new front data packet.

The priority queue repeatedly referred to above has the unique characteristic of having, at most, only one time label from each data stream. This is because the priority queue only contains the time labels of front data packets and, since a data stream only has a single stream queue with a single front, each data stream can only be represented once in the priority queue. To maintain this characteristic, a time label in the priority queue is removed after the front data packet assigned that time label is transmitted on the virtual channel. After such a transmission, the multiplexer queries the stream which was the origin of the transmitted data packet. This query is by way of signaling this particular data stream to replace its representative in the priority queue. However, this is not to say that each and every data stream has to have a representative time label in the priority queue at every moment in time. If a data stream is inactive and hence does not have any data packets in its stream queue, such a data stream will not be represented in the priority queue.

To implement the priority queue, it is preferred to use a data structure which facilitates ease of sorting and addition and subtraction of elements in the queue. A binary sort tree can be used for the priority queue with the tree's nodes as the different time label of the front data packets of the different data streams. Such a tree can be constructed and maintained in the same manner as the heap used in the heap sort type of sorting processes. This structure is well known in the field. See, for example, DATA STRUCTURES AND ALGO-RITHMS by Aho, Hopcroft and Ullman, 1983, Addison-Wesley, pp. 135–145 and pp 271–274.

Regarding the comparison between time labels in the priority queue that the multiplexer must accomplish, an arithmetic problem may arise.

There remains the arithmetic problem related to comparisons of the time labels in the priority queue.

This contains only one time label per stream (see multiplexing principle). The time gap between two labels must be such that a comparison of their two values is always possible. In the case of an unsigned binary representation, the following condition must be verified by two values to be compared, $V_1$ and $V_2$, coded in n bits $|V_1 - V_2| < 2^{n-1}$.

The method of calculating the time labels makes it possible to determine the maximum time gap between two labels of an active stream, an active stream being a stream for which a label is present at any instant in the priority queue; this maximum gap verifies:

$$PAT_i^{k+1} - PAT_i^k \le MPS \times T_{\max}$$

where MPS (Maximum Packet Size) is the maximum size of a packet expressed in cells/segments and $T_{max}$ is the period corresponding to the lowest guaranteed minimum transmission speed which can be allocated to a stream.

In this relationship, $$PAT_i^k$$

is the label of the last packet sent of stream i and $$PAT_i^{k+1}$$

is the label of the following packet, injected into the priority queue.

When the packet k is sent, the following is true:

$$PAT_i^k = PAT_{\min}^i$$

and, αfortiori, the relationship:

$$PAT_1^{k+1} \ge PAT_{\min}^{l+1}$$

is always verified $$PAT_{\min}^l$$

and $$PAT_{\min}^{l+1}$$

being two successive values of the head of the priority queue).

This therefore gives:

$$PAT_i^{k+1} - PAT_{\min}^{l+1} \le MPS \times T_{\max}$$

Finally, in the worst case where:

$$PAT_{\min}^{l+1} = PAT_i^k,$$

corresponding to the case where the label of the next packet to be sent, to whichever stream this packet belongs, is equal to that of the last packet sent belonging to stream i.

If, furthermore, the packet k+1 is of size MPS and stream i has a period $T_{max}$, the following can be true:

$$PAT_i^{k+1} - TPAT_{\min}^{l+1} = MPS \times T_{\max}$$

For unsigned values coded in n bits, $T_{max}$ and MPS must then verify:

$$MPS \times T_{\max} < 2^{n-1}.$$

In a corresponding manner, when a stream is inactive, that is when there is no time label corresponding to this stream in the priority queue, the label of the last packet sent, $$PAT_i^k$$

can "age" in such a way that, upon reception of a new packet originating from the same stream, the value of its label, $$PAT_i^{k+1},$$

calculated from that of the last packet sent, can no longer be compared with the current value of the head of the priority queue, $PAT_{min}$. It is therefore necessary to introduce a mechanism for "lapsing" the labels of inactive streams making it possible to detect the "ageing" of the label of the last packet sent. So that $$PAT_i^{k+1}$$

and $PAT_{min}$ can be compared, they must verify:

$$|PAT_i^{k+1} - PAT_{\min}| < 2^{n-1}$$

that is:

-continued $$|PAT_i^k + P_1^{k+1} - PAT_{\min}| < 2^{n-1} \quad [4]$$

where $P_1^k + 1$ is the time length of the packet $k + 1$ with $1 \le P_i^{k+1} \le MPS \times T_{\max}$.

Furthermore, $PAT_{\min} \ge PAT_i^k$.

Two extreme cases can then arise:

If $PAT_i^k = PAT_{\min}$ and $P_i^{k+1} = MPS \times T_{\max}$ then the conditions described for an active stream are encountered, that is:

$MPS \times T_{\max} < 2^{n-1}$

If $PAT_i^k \ll PAT_{\min}$ and $P_1^{k+1} = 1$, condition [3] can then be written:

$PAT_{\min} - PAT_i^k < 2^{n-1} + 1$ fixing the maximum time gap between the head of the priority queue and the label of the last packet sent of stream i.

When this last condition is not verified, the label is marked as being lapsed. The following received packet of the stream is then routinely assigned a time label equal to that situated at the head of the priority queue at the end of its segmentation.

If the priority queue becomes empty, scanning is stopped. Calculation of the labels of packets received subsequently is performed according to [3].

At their initialization, all the streams are marked as being lapsed so as to initialize the calculation of their time labels.

The label lapsing mechanism can be implemented as follows.

Each cell time, the lapsing process processes a different stream (as the m multiplexed streams are identified by an integer index between 0 and m−1, a modulo m cyclic counter, incremented each cell time, can be used to select the stream to be processed). If the stream is active (it has a label in the priority queue) no action is undertaken. If the stream is inactive, the value of the label of the last packet sent is compared with the value of the label at the head of the priority queue and the stream is marked in accordance with the criterion described above.

The stream scanning cycle therefore lasts m cell times. During this time interval, the head of the priority queue may be occupied by different labels of equal or increasing values. The maximum variation of these values is $T_{max}$ per cell time, that is, over the duration of one stream scanning cycle: $(m-1) \times T_{max}$.

Consequently, in the worst case, the same stream may be scanned, during two consecutive scanning cycles, with values of $PAT_{min}$ which are $m \times T_{max}$ apart. These values are denoted as $PAT_{\min}^k$ and $PAT_{\min}^l$.

These two are the values of the head of the priority queue at the time of two successive scanning passes of stream i. So that $PAT_{\min}^l$ and $PAT_i^l$ remain able to be compared, they must verify:

$$|PAT_{\min}^l - PAT_i^k| < 2^{n-1}, \quad [5]$$

and, in particular, if, at the time of the first scanning cycle, the time label for packet k was equal to the time label at the head of the priority queue, the following were true:

$PAT_i^k = PAT_{\min}$,

[5] can then be written:

$$|PAT_{\min}^l - PAT_{\min}^k| < 2^{n-1},$$

leading to the following condition on $T_{max}$ and m:

$m \times T\max < 2^{n-1}$

The invention can be implemented by a person skilled in the art using a combination of properly connected well-known devices. The multiplexer, because of the processing it has to perform, can be either a general purpose central processing unit (CPU) coupled to suitable memory means or a specialized processing unit. The memory means can be any form of short term memory such as RAM and will serve as the buffer memory for the segments of the packets and for the time labels which must periodically by stored. The gating between the data streams and the multiplexer can be implemented by a person skilled in the art as any suitable switching means. Obviously, the processor means or the multiplexer must be coupled to the memory, the gating means, and the transmission means used for transmitting the packet segments to the virtual channel.

Figure 4:
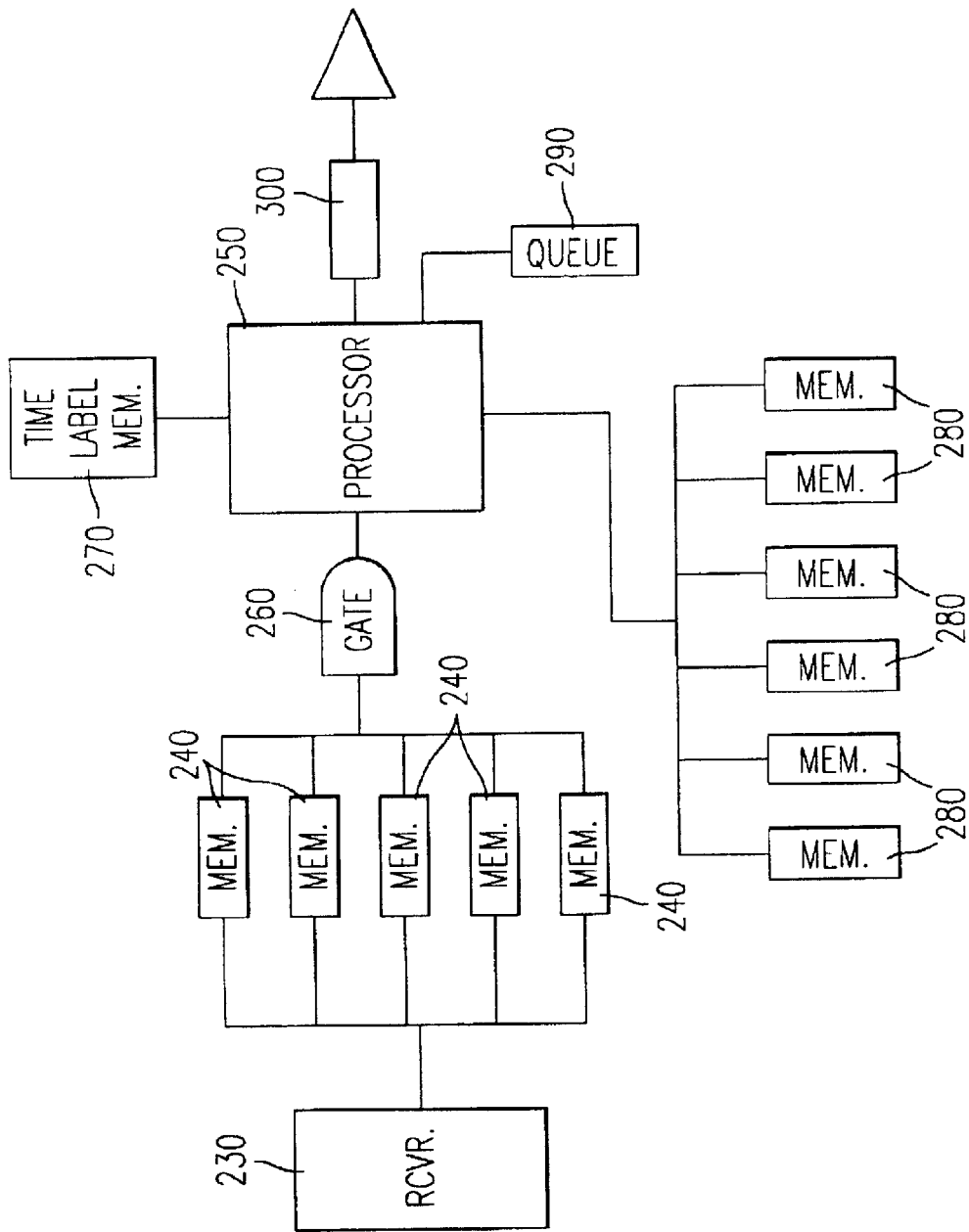
FIG. 4 is a block diagram detailing the interconnections between components necessary to carry out the invention.

FIG. 4 illustrates an example of the interconnections required to carry out the above invention. The receive means 230 receives the data packets from the outside world and sends these data packets to the buffering memory means 240. This buffering memory means 240 buffers the data packets before the data packets are sent on to the processing means 250 where all the processing, decision making, and segmenting is carried out. Before the data packets reach the processing means 250, they go through the gating means 260 which determines when it is safe and allowable to send more data packets to the processing means 250. The processing means 250 then receives the data packet and segments, assigns a time label, and buffers both the segments and time label assigned to the data packet. The time label is sent to the time label buffer memory means 270 where the time label is properly categorized and queued into its proper stream queue. The segments are sent to a segment buffer memory means 280 where they are also categorized into their proper stream queues. The time label and the segments which correspond to a specific data packet are cross-referenced so that they are all identified only with the specific data packet.

The processing means 250 also maintains the priority queue 290 either in the time label buffering means 270 or within its own memory. Once the processing means 250 determines that a data packet is to be sent to the transmission means 300, a signal is sent to the appropriate segment buffer memory means and the relevant segments are transmitted to the virtual channel.

Figure 5:
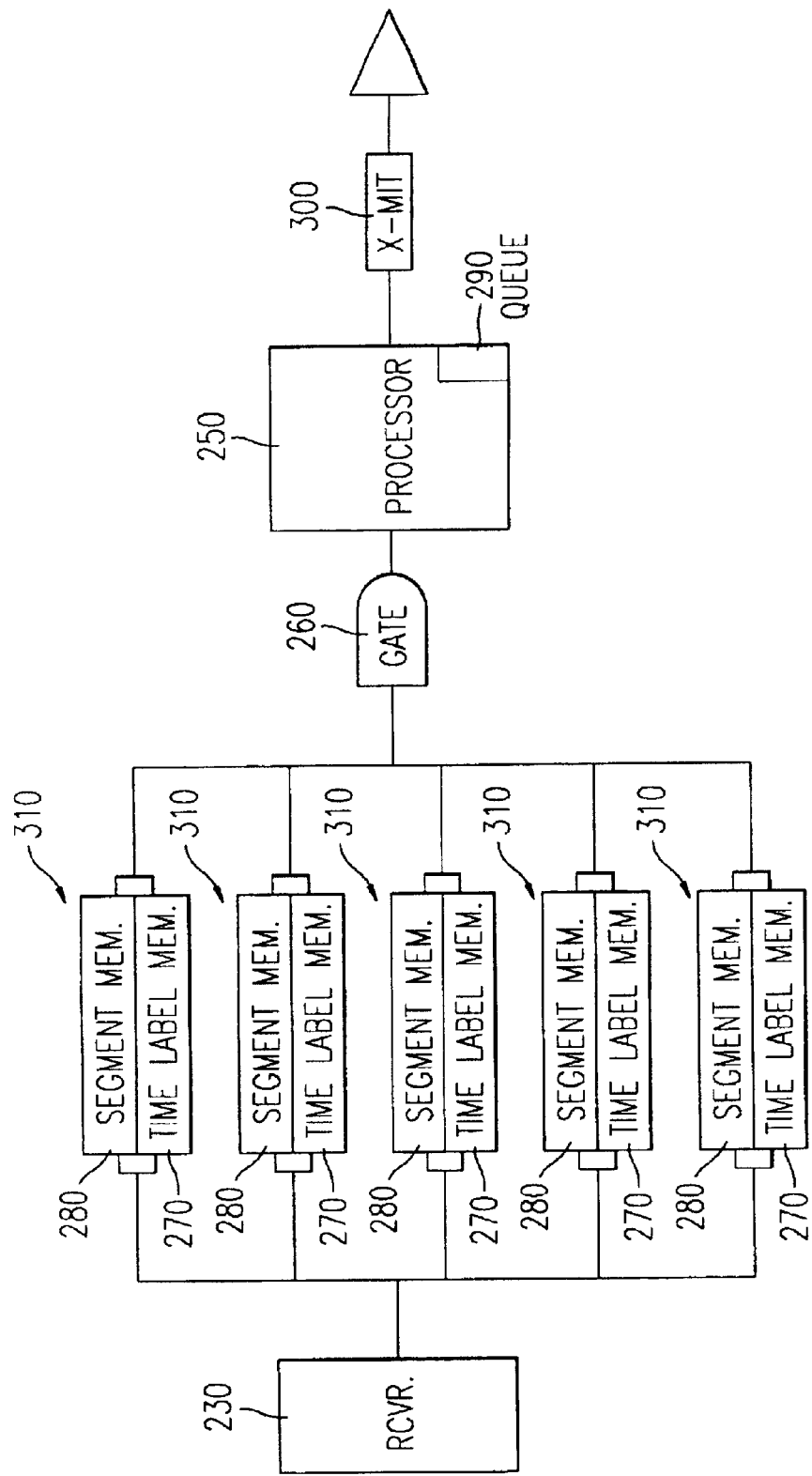
FIG. 5 is a block diagram detailing alternative interconnections between components necessary to carry out the invention.

An alternative scheme to the above is shown in FIG. 5. In this configuration, the processing tasks are split between the receiving means 230 and the processing means 250. The receive means 230 not only receives the data packets from the outside but also segments, assigns time labels, and queues them in the appropriate stream queue. The stream queue is implemented as a stream buffer means 310 which includes within it the time label buffer memory means 270 and segment memory buffer means 280. The gating means 260 still acts as a gatekeeper for the processing means 250, determining when and what should be sent to the processing means 250 based on input from the processing means 250. The processing means 250 again maintains the priority queue 290 within its memory. The transmission means 300 is coupled between the virtual channel VC and the processing means 250 with the processing means 250 determining which data packets are sent to the transmission means 300.

A person understanding this invention may now conceive of alternative structures and embodiments or variations of the above. All of those which fall within the scope of the claims appended hereto are considered to be part of the present invention.

What is claimed is:

1. Method of multiplexing in a multiplexer a plurality of data streams to a single channel each of said data streams containing a plurality of fixed length data packets being serially transmitted from a source to a destination by way of the data stream and the channel, the method comprising:

for each data stream:
   a) receiving a data packet at an input of a data stream;
   b) segmenting the data packet into segments;
   c) assigning a time label to the data packet, the time label containing data indicating an estimated arrival time for the packet at the multiplexer;
   d) transmitting the time label to the multiplexer at a first signal;
   e) transmitting the segments comprising the data packet to the channel at a second signal from the multiplexer; and
   f) storing the time label as a previously transmitted stream time label;

for the multiplexer:
   aa) signaling to transmit a time label of one of the plurality of data streams at the first signal;
   bb) receiving a received time label associated with the one of the plurality of data streams;
   cc) storing the received time label in a group of received time labels the group of time labels containing received time labels from other data streams;
   dd) sorting the group of received time labels to determine a transmitting time label with an earliest estimated arrival time of the group;
   ee) sending said second signal associated with the transmitting time label to transmit the segments comprising a transmitting data packet to the channel, said transmitting data packet being a data packet assigned with the transmitting time label;
   ff) storing the transmitting time label as a previously transmitted channel time label; and
   gg) removing the transmitting time label from the group after the segments comprising the transmitting data packet have been transmitted.

2. Method as claimed in claim 1 wherein step c) further includes:
   c1) storing the data packet in a FIFO (first in, first out) stream queue, the stream queue having a front end and containing previously received data packets, the stream queue also having a front data packet being a data packet at the front of the stream queue;
   c2) calculating the estimated arrival time for the data packet at the destination of the data packet;
   c3) choosing the time label for the data packet based on a condition chosen from the group comprising:
       if the group is not empty, the later of:
           c31) the estimated arrival time of the data packet; and
           c32) the time label of the packet currently transmitted;
           if the group is empty, the later of
           c3a) the estimated arrival time of the data packet and
           c3b) the previously transmitted channel time label.

3. Method as claimed in claim 2 wherein step c2), further includes calculating the estimated arrival time for the data packet at the multiplexer of the data packet by cumulatively adding for every segment produced from the data packet a predetermined minimum inter-segment time to a segment time counter, the segment time counter initially having a value equal to the estimated arrival time for the previous data packet, the previous data packet being.
   a previously received data packet; and
   received by the data stream immediately preceding the data packet.

4. Method as claimed in claim 1 wherein step b) further includes serially storing the data packet segments in a segment list.

5. Method as claimed in claim 1 wherein step cc) includes storing the group in a priority queue.

6. Method as claimed in claim 5 wherein in the priority queue has a binary sort tree structure.

7. Method as claimed in claim 6 wherein the priority queue is stored in an array.

8. Method as claimed in claim 1 wherein step dd) further includes comparing the received time labels to determine the transmitting time label.

9. Method as claimed in claim 8 wherein, if a time gap between the transmitting time label and the previously transmitted stream time label of a lapsed data stream is greater than a predetermined value, a next data packet from that lapsed data stream is assigned a time label equal to the transmitting time label in use when the next data packet is segmented.

10. Device for multiplexing a plurality of data streams onto a single channel, each of said data streams containing a plurality of data packets being transmitted to a destination, the device including:
    receiving means for receiving the data packets from the plurality of data streams;
    buffering memory means for each data stream for serially buffering received data packets;
    processor means for:
    a) segmenting each received data racket into segments;
    b) measuring:
        a size of the segments; and
        a size of the packets;
    calculating and assigning a time label to each data packet, said time label containing data indicating an estimated arrival time for each packet at the multiplexing device; and d) comparing time labels of data packets to determine a transmitting time label having an earliest estimated arrival time of the data packets;

transmission means for transmitting to the single channel the segments comprising the data packet assigned the transmitting time label having the earliest estimated arrival time;

gating means for controlling the transmission of data packets from the buffering memory means to the processing means;

time label buffer memory means for storing time labels assigned to the data packets; and segment buffer memory means for temporarily storing the segments; wherein the processor means is coupled to:
the segment buffer memory means;
the transmission means;
the gating means; and
the time label buffer memory means; and the buffering memory means is coupled between the receive means and the gating means.

11. Method of determining transmission priority for data packets between data streams, each data stream having a plurality of data packets for transmission to a destination, the method comprising:

a) for each data stream:
aa) serially arranging the data packets into a stream queue having a front;
ab) assigning a time label to each data packet, said time label containing data indicating an estimated arrival time for said data packet at a segmentation and multiplexing device;
ac) sending the time label of a front data packet to a priority queue containing other time labels of other front data packets, a front data packet being the data packet at the front of a stream queue and
ad) associating the time label of the front data packet with the data stream which contains the front data packet assigned to the said time label;

b) determining which time label in the priority queue has an earliest estimated arrival time; and c) giving transmission priority to the data stream associated with the time label having the earliest estimated arrival time, said transmission priority being for transmitting the front data packet assigned to the time label having the earliest estimated arrival time.

12. Device for multiplexing a plurality of data streams onto a single channel, each of said data streams containing a plurality of data packets being transmitted to a destination, the device including:

receiving means for:
a) receiving and segmenting the data packets into segments, said data packets being received from the plurality of data streams;
b) measuring:
a size of the segments; and
a size of the packets;
c) calculating and assigning a time label to each data packet, said time label containing data indicating an estimated arrival time for each packet at the device;

segment buffer memory means for temporarily storing the segments;

processor means for comparing time labels of data packets to determine a transmitting time label having an earliest estimated arrival time of the data packets;

transmission means for transmitting to the single channel the segments comprising the data packet assigned the transmitting time label having the earliest estimated arrival time;

gating means for controlling the transmission of data packets from the segment buffer memory means to the processing means;

time label buffer memory means for storing time labels assigned to the data packets; and wherein:
the processor means is coupled to the transmission means;
the gating means is coupled between the processing means and
the segment buffer memory means, and
the time label buffer memory means; and
the receiving means is coupled to the segment buffer memory means and the time label buffer memory means.

* * * * *